United States Patent
Barp

[11] Patent Number: 5,116,696
[45] Date of Patent: May 26, 1992

[54] GAS AND AIR FEED MEMBER FOR A FEED CELL BATTERY AND A FUEL CELL BATTERY

[75] Inventor: Bruno Barp, Rudolfstetten, Switzerland

[73] Assignee: Sulzer Brothers Limited, Winterthur, Switzerland

[21] Appl. No.: 637,076

[22] Filed: Jan. 3, 1991

[30] Foreign Application Priority Data

Jan. 9, 1990 [CH] Switzerland ............... 00066/90

[51] Int. Cl.$^5$ .............................................. H01M 8/04
[52] U.S. Cl. .................................... 429/26; 429/34; 429/39
[58] Field of Search ............... 429/26, 34, 35, 38, 429/39

[56] References Cited

U.S. PATENT DOCUMENTS

| | | | |
|---|---|---|---|
| 3,394,032 | 7/1968 | Danner | 136/86 |
| 4,169,917 | 10/1979 | Baker et al. | 429/26 |
| 4,476,198 | 10/1984 | Ackerman et al. | 429/32 |
| 4,490,445 | 12/1984 | Hsu | 429/32 |

FOREIGN PATENT DOCUMENTS 2182650 12/1973 France .
0490742 6/1970 Switzerland .
86/06762 11/1986 World Int. Prop. O. .

OTHER PUBLICATIONS

Patent Abstracts of Japan, vol. 10, No. 39 (E-381) [2096], Feb. 15, 1986.
Patent Abstracts of Japan, vol. 11, No. 306 (E-546) [2753], Oct. 6, 1987.
Patent Abstracts of Japan, vol. 14, No. 117 (E-898) [4060], Mar. 5, 1990.

*Primary Examiner*—Anthony Skapars
*Attorney, Agent, or Firm*—Kenyon & Kenyon

[57] ABSTRACT

The fuel cell battery has cells connected in series and is comprised an axially symmetrical stack of gas and air feed members and electrochemically active plates arranged alternately. Each feed member has an air heat exchanger in which the supplied air is heated. Gas and air may be made to flow in parallel on both ides of the electrochemically active plates. For each feed member, only one sealing ring is required to separate the air and gas spaces. The fuel cell battery has the advantage that induced stresses due to thermal expansion are small.

26 Claims, 4 Drawing Sheets

GAS AND AIR FEED MEMBER FOR A FEED CELL BATTERY AND A FUEL CELL BATTERY

This invention relates to a gas and air feed member for a fuel cell battery as well as to a fuel cell battery.

Heretofore, various types of fuel cells have been known for generating electrical energy from the combustion of gases. Generally, these fuel cells have been provided with an electrochemically active member made of a ceramic solid electrolyte which forms a cathode at which oxygen molecules are ionized, absorbing electrons and an anode, at which oxygen ions are converted with hydrogen and/or carbon monoxide to water or carbon dioxide, giving off electrons. The ceramic solid electrolyte connects the two electrodes, which consists of metal oxides and can conduct oxide ions. The oxygen ions travel through the solid electrolyte by diffusion, which is efficient only at higher temperatures (approximately 1000° Celsius) and only for thin layers (approximately 100 micrometers). The lower the temperature or the thicker the layer of electrolyte, the lower the efficiency of the fuel cell. Ceramic electrolytes of this type are commercially available. It is likely that in the future solid electrolytes will be developed which are efficient at lower temperatures and with thicker layers.

EP0 055 011 discloses apparatus with a plurality of tubular fuel cells, which produces electrical energy and heat from air and combustible gases, more particularly hydrogen and carbon monoxide. A fuel cell of this type comprises a porous, air-permeable support tube, to whose external surface the cathode, solid electrolyte and anode are applied in the form of thin, mutually superimposed layers. The anode, which forms the outer layer, and the electrolyte layer are interrupted at a place extending over the entire length of the active portion of the tube. This strip is designed as an electrical contact point for the cathode. The fuel cell is closed at one end. A feed tube for the air leads to this end inside the support tube. This feed tube also acts as a heat exchanger, the previously preheated air passing through the feed tube absorbs heat which is released during the electrochemical reactions. This additional heating is advantageously utilized during the process. Apparatus with fuel cells of this type has the advantage that no seals are required between the air spaces and the gas spaces. Unfortunately, however, such fuel cells are complicated and therefore expensive to manufacture.

In another type of fuel cell with solid electrolytes, the electrochemically active member is flat and forms a thin-layered plate, to both sides of which the electrodes are applied, and in which the air need not diffuse through a porous support structure. Fuel cells of this type are much cheaper to produce than tubular cells. However, serious problems arise with the seal between the gas and air spaces. Also, with these arrangements, gas and air run transversely or in opposite directions to each other, which is disadvantageous as regards efficiency and thermal stresses.

Still other types of electric fuel cells have been known from U.S. Pat. Nos. 3,394,032; 4,169,917; 4,476,198; and 4,490,445.

Fuel cell batteries have also been known which employ stacks of fuel cells such as described in Swiss Patent 490,742; French Patent 2,182,650 and International Patent Application WO 86/06762.

Accordingly, it is an object of the invention to create a fuel cell battery with flat cells in which air spaces can be sealed off from gas spaces by simple means.

It is another object of the invention to provide a fuel cell battery wherein gas and air can flow in parallel and induced stresses due to differences in thermal expansion can be maintained relatively small.

Briefly, the invention provides a gas and air feed member for a fuel cell battery which is comprised of an axially symmetrical plate-like hollow member which defines a boundary between a gas space for exposure to an electrochemically active plate and an air space as well as a tubular member passing through the hollow member on an axis of symmetry thereof for conducting a gas flow therethrough. This tubular member is also in communication with the gas to space deliver a flow of gas therethrough in countercurrent to a flow of air in the air space. In addition, the tubular member has flange-like ends disposed for contact with an electrochemically active plate.

The invention further provides a fuel cell battery comprising a plurality of electrochemically active plates disposed in coaxially spaced apart stacked relation and a plurality of the gas and air feed members disposed in alternating relation with the electrochemically active plates. In this case, at least one of the feed members has a plate-like hollow member parallel to and spaced between a pair of the electrochemically active plates in order to define a gas space exposed to one of the plates and an air space exposed to the other of the plates. In addition, a means is provided for passing a flow of gas into each respective air space in countercurrent to a flow of gas in an adjacent gas space for removing heat therefrom.

The feed members and alternating electrochemically active plates form a stack in which a cathode and anode of adjoining plates are electrically connected. Further, the electrodes are formed of very thin films of only a few micrometers in thickness. Hence, electron conduction along the surfaces of the electrodes is associated with high electrical resistances. In order to allow ohmic losses to be kept down, the entire electrode surfaces are provided with a plurality of contact points which are distributed over the electrode surfaces for the supply and discharge of electrons. In this respect, the optimum distance between contact points depends, inter alia, on the conductivity of the electrodes and their thicknesses. In this respect, a plurality of electron-conducting structures are disposed in each of the gas space and the air space with each structure having a contact element forming an electrical connection with a surface of a respective electrochemically active plate.

The fuel cell battery is of particularly simple construction since the gas and air feed members and the electrochemically active plates can be produced as separate parts. This is simpler than if the cells are produced as units combining the functions of the two components.

Further, the two-part and rotationally symmetrical construction of the feed members for the fuel cell allows thermal expansion to be unimpeded so that inherent stresses are low.

Further, the fuel cell battery is provided with a plurality of sealing rings which are disposed coaxially of the electrochemically active plates with each sealing ring being clamped between a pair of the gas an air feed members. In this respect, for each cell or stage, due to the annular shape of such, only one seal is required.

Furthermore, this single sealing ring can be exposed to the air space.

These and other objects and advantages of the invention will become more apparent from the following detailed description taken in conjunction with the accompanying drawings wherein.

Figure 1:
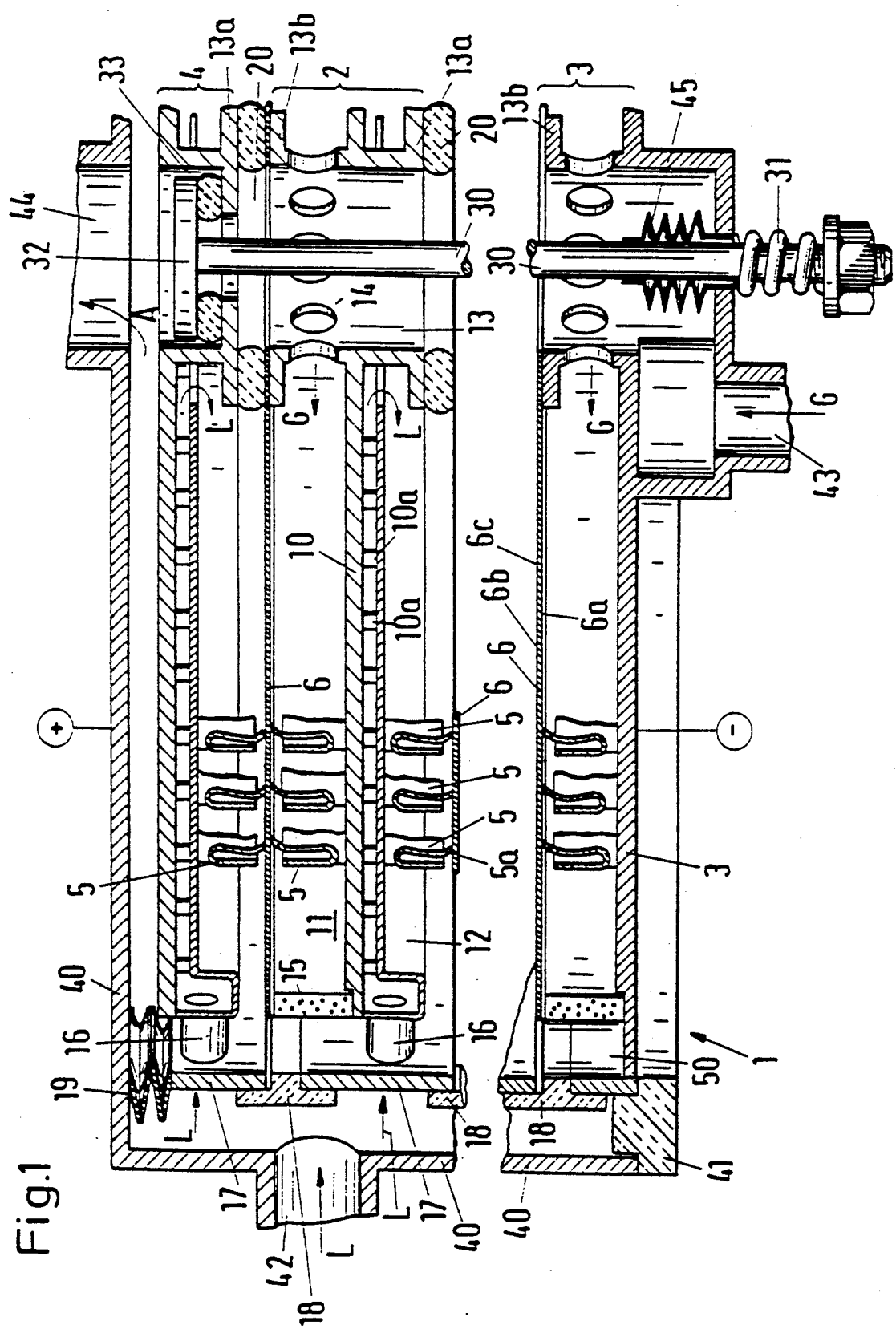
FIG. 1 illustrates a longitudinal cross-sectional view through a section of a fuel cell battery constructed in accordance with the invention.

Referring to FIG. 1, the fuel cell battery 1 is comprised of a fairly large number of similar cells connected in series in the manner of a stack. One complete cell is illustrated. As indicated, the stack is closed at each end by special end members 3, 4.

Each fuel cell is formed of a gas and air feed member 2, an electrochemically active plate 6 on the upper side, as viewed, and a plurality of electron-conducting structures 5 on opposite sides of the electrochemically active plate 6. As illustrated, the plates 6 of adjacent cells are shared. Alternatively, the cell may be constructed differently, i.e. with an electrochemically active plate 6 as a central component and with feed members 2 which form only a part of a respective cell.

Each cell is axially symmetrical, for example, being circular or polygonal. Further, each gas and air feed member has an axially symmetrical plate-like hollow member 10 which serves as a heat exchanger and which defines a boundary between a gas space 11 exposed to the electrochemically active plate 6 and an air space 12. In addition, the feed member 2 has a tubular member 13 passing through the hollow member 10 on an axis of symmetry thereof for conducting a gas flow therethrough. This tubular member 13 is also in communication with the gas space 11 via a plurality of apertures 14 in order to deliver a flow of gas therethrough in countercurrent to a flow of air in the air space 12.

Each electrochemically active plate 6 is a solid electrolyte of known construction for conducting opposite ions and has a coating on each side for conducting an electroreaction and for electric conduction. During operation, the heat released in the electrode reactions is partly absorbed by the air. The remainder of the heat of reaction is carried away by the gas.

Gas is fed in through the central tubular member 13 coaxial with the axis of symmetry of the cell. The apertures 14 for the gas may be designed as constriction members so that the gas supply to all cells is uniform. The gas space 11 is closed at the periphery by a perforated or porous, gas-permeable wall 15.

The air is fed through suitable means, such as radial supply tubes 16 into a chamber within the hollow heat exchanger 10 which communicates with the air space 12 and enters the air space 12 at the central tubular member 13. As shown, gas and air are fed in such away that parallel flow is possible on the two sides of the electrochemically active plates 6. Inside the hollow heat exchanger 10, fins 10a or other members may promote heat transfer. The supply tubes 16 are connected to a cylindrical wall member 17 which defines the feed member 2 externally.

Figure 2A:
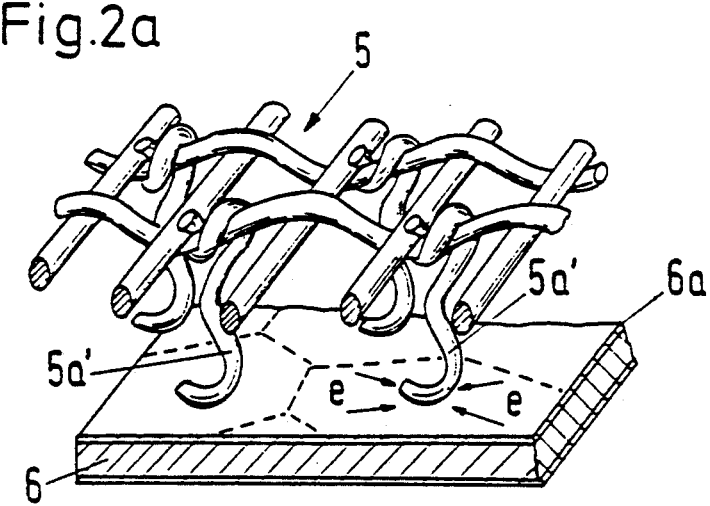
FIG. 2a illustrates a part perspective view of an electron-conducting structure in contact with an electrochemically active plate in accordance with the invention.

The electron-conducting structures 5 are disposed in each of the gas space 11 and air space 12 and are connected by means of contact elements 5a to the anode 6a and cathode 6b of the plate 6 as indicated in FIG. 2a. These contact elements 5a form electrical connections with the surfaces of the plate 6 and may be produced, as structural connections, by diffusion welding or soldering. The contact elements 5a are resilient and can react flexibility in the axial and radial direction if distortion occurs due to thermal expansion for example. The electron-conducting structures 5 are also in electrical contact with the heat exchanger 10, which again is electrically conductive. This results in an electrical connection between the anode 6a and cathode 6b of adjacent electrochemically active plates 6. The structures 5 also promote heat transfer between the electrodes 6a, 6b and heat exchanger 10.

The contact elements 5a are pressed onto the electrochemically active plates 6. Since these plates 6 are very thin (approximately 150 micrometers) it is advantageous if the contact points on the two sides are all arranged in pairs, as illustrated in FIG. 1.

In contrast to the embodiment shown in FIG. 1, it is not necessary, in a variant embodiment, for the electron-conducting structures 5 to make electrical contact at intervals over the whole of the hollow heat exchanger 10. If the structures 5 are cohesive in respect of electrical conduction, a single contact point will suffice for the electrical connection. The heat exchanger 10 can also be bridged by an additional electrical conductor.

Referring to FIG. 1, a plurality of sealing rings 20 are also provided coaxially of the plates 6 with each sealing ring 20 being clamped to and between a pair of the feed members 22. In this respect, each tubular member 13 has a pair of flange-like ends 13a, 13b with the upper end 13b receiving an electro-chemically active plate 6 thereon. As indicated, each sealing ring 30 is disposed on top of a plate 6 so as to be exposed to an air space 12 of the overlying cell.

A centrally mounted traction member 30 is also provided for clamping the plates 6, feed members 2, sealing rings 20 and end members 3, 4 together.

Each sealing ring 20 is made, for example, of ceramic felt and serves to prevent gas from penetrating into the adjacent air space 12. Each cylindrical peripheral wall member 17 which is coaxial of a feed member 2 defines an annular space therewith in order to receive a flow of air from the air space 12 and a flow of gas from the gas space 11 via the gas-permeable wall 15. As indicated, spacer rings 18 of electrically insulating material are loosely applied between the wall members 17 and are intended to allow enough play between the wall members 17 so as not to impede axial motion of the cells. The play should, however, be slight so that only a small amount of air can enter through the spaces therebetween. The annular space 50 between the walls 17 and periphery of the hollow heat exchanger 10 permits the combustion of gas which is spent but still which contains some fuel.

The end members 3, 4 substantially correspond to one side of the feed members 2. The lower end member 3 forms the base of the housing of the fuel cell battery 1 while the upper end member 4, in the embodiment illustrated is electrically connected by a resilient bellows 19 to the upper portion 40 of the housing wall. An annular electrical insulator 41 connects the upper portion 40 of the housing wall to the lower end member 3. The upper portion 40 forms the positive pole of the fuel cell battery 1 and the base 3 of the housing the negative pole. The poles are represented symbolically in FIG. 1 by plus and minus signs enclosed in circles.

The air is fed to the fuel cell battery through a spigot 42 and the gas through a spigot 43. The waste gas leaves the apparatus through a spigot 44. The hot waste gas is used to preheat the fresh air in a recuperator (not shown). The gas is advantageously also preheated before it is fed to the battery 1. Arrows in FIG. 1 indicate the directions of flow for the air (L), gas (G) and waste gas (A).

The traction member 30 clamping the stack of cells together may for example be tightened by means of a compression spring 31 mounted outside the housing. The construction of the apparatus as a whole is such that when the sealing rings 20 yield, the stack can contract somewhat unimpeded, so maintaining the seal. The traction member 30 bears on the stack of cells by means of a cover plate 32, via a sealing ring 33. The passage for the traction member 30 in the base of the housing is provided with a resilient bellows 45 to prevent gas from escaping into the atmosphere.

Theoretically, the construction of the fuel cell battery could be modified to feed the air in centrally from the interior and to feed the gas in from the periphery. This solution, however, would be less advantageous, since the sealing rings which would come to bear on the periphery of the stack of cells would require to be much larger than in the apparatus embodying the invention.

Figure 2B:
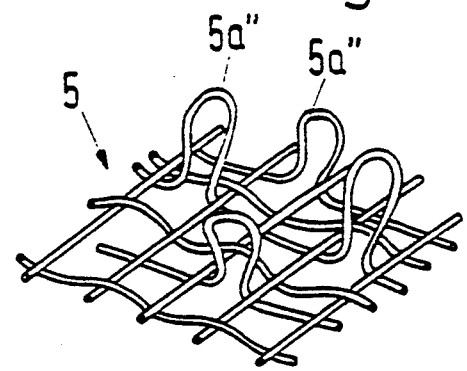
FIG. 2b illustrates a modified electron-conducting structure in accordance with the invention.

FIGS. 2a and 2b illustrate two examples of electron-conducting structures 5 which can be made of wire. The contact members 5a are attached to a wire mesh, and are either in the form of corrugated wire portions 5a (FIG. 2a) or wire loops 5a" (FIG. 2), in which case a plurality of loops may be provided in a single wire. FIG. 2a also shows part of the electrochemically active plate 6. The arrows on the anode 6a indicate the flow of electrons e moving towards the contact member 5a'.

Figure 3:
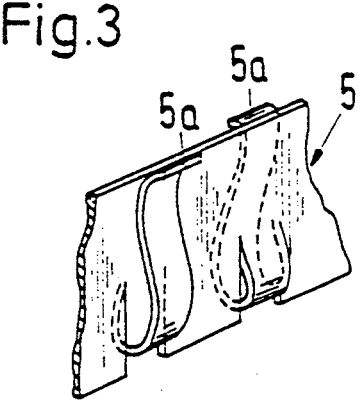
FIG. 3 illustrates a further modified electron-conducting structure in accordance with the invention which also performs a flow guiding function.
Figure 4:
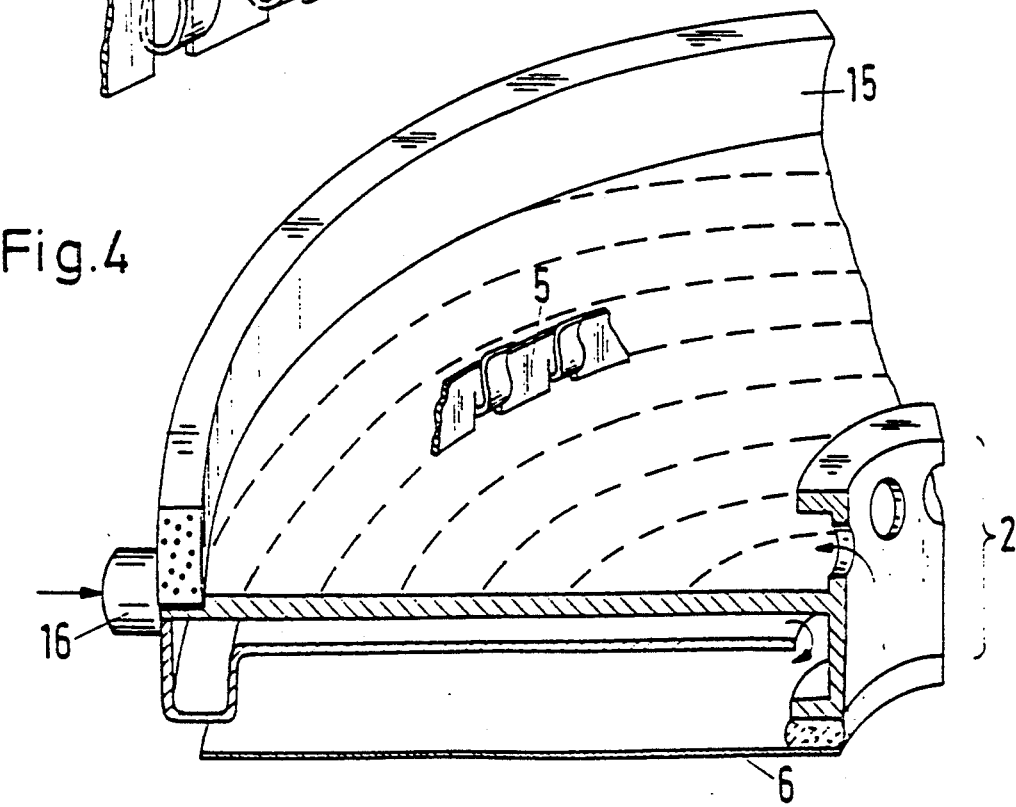
FIG. 4 illustrates a detail of a feed member with other parts of the fuel cell battery in accordance with the invention.

FIG. 3 shows a detail from an electron-conducting structure 5 which also has a flow guiding function. In FIG. 4 broken curves show how such flow-guiding structure 5 may be arranged in the gas space 11. The spiral arrangement ensures optimum interaction of the gas with the electrode. The electron-conducting structure 5 in FIG. 4 is a variant of the embodiment shown in FIG. 3 and corresponds to the construction shown in FIG. 1. These electron-conducting structures 5 consist of thin strips of sheet metal, tongue-like portions of which are bent to form S-shaped contact members 5a.

The air space 12, also, may be provided with an electron-conducting function.

Figure 5:
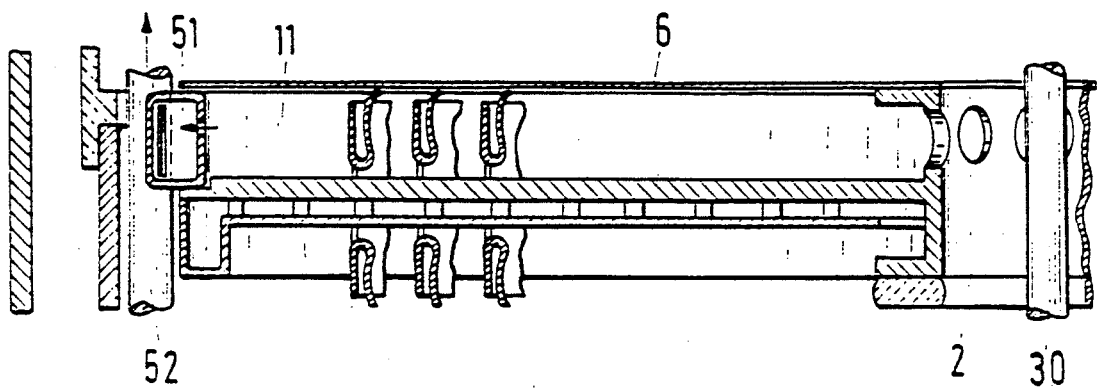
FIG. 5 illustrates a cross-sectional view of a modified gas and air feed member in accordance with the invention having a duct for spent gas in accordance with the invention.

Referring to FIG. 5, wherein like reference characters indicate like parts as above, each fuel assembly may be formed with a duct 51 which is coaxial of the feed member 2 and in communication with the gas space 11 for receiving gas therefrom. In addition, a header 52 is vertically disposed, as viewed, within the space between the hollow heat exchanger and peripheral wall 17 while being connected to the respective ducts 51 to remove gas therefrom. In this way, the spent gas can be drawn off via the ducts 51 and discharged separately from the battery 1. This gas can either be partly added to the feed gas and/or burnt outside the battery 1.

Figure 6A:
FIG. 6a illustrates a cross-sectional view of an electrochemically active plate of conical shape.
Figure 6B:
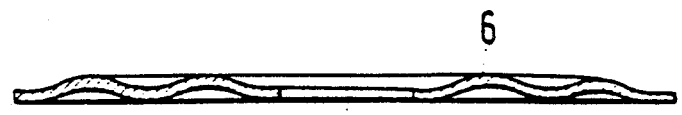
FIG. 6b illustrates a cross-sectional view of an electrochemically active plate having a corrugated shape.

During operation of the fuel cell battery 1, temperature gradients in the radial direction lead to thermal stresses. In order to dissipate these stresses, each electrochemically active plate 6 may be made of conical shape as illustrated in FIG. 6a or of a corrugated shape as illustrated in FIG. 6b.

Figure 7A:
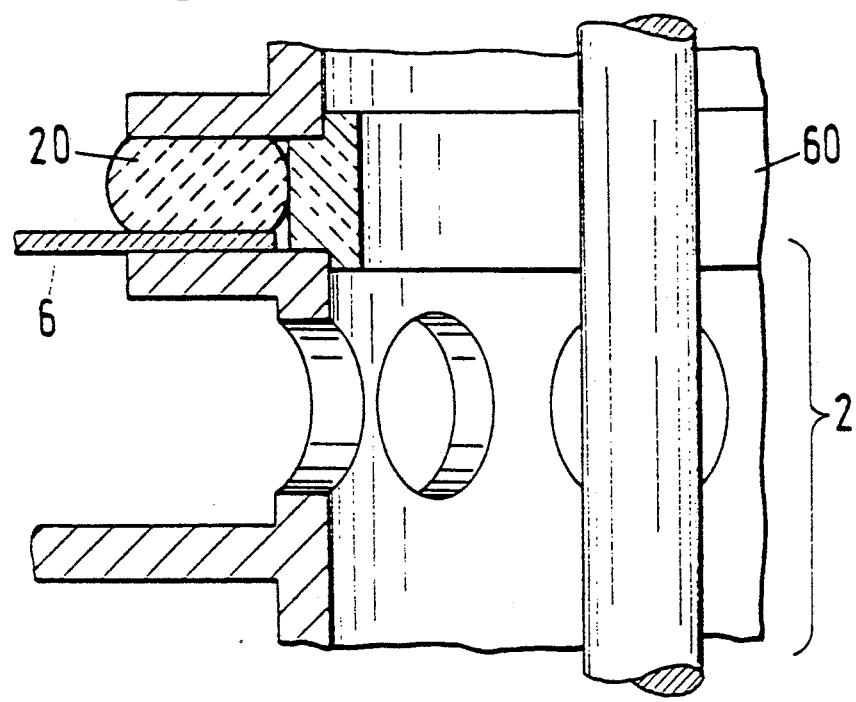
FIG. 7a illustrates a part cross-sectional view of a pair of adjoining gas and air feed members spaced apart by a spacer ring in accordance with the invention.

Referring to FIG. 7a, in order to eliminate a risk of damage to the electrochemically active plates 6 in a fuel cell battery as shown in FIG. 1, if the cell stack is clamped together too tightly, spacer rings 60 may be disposed in alternating relation with the feed members 2. As indicated, each spacer ring 60 serves to space the adjacent feed members 2 coaxially of each other.

Figure 7B:
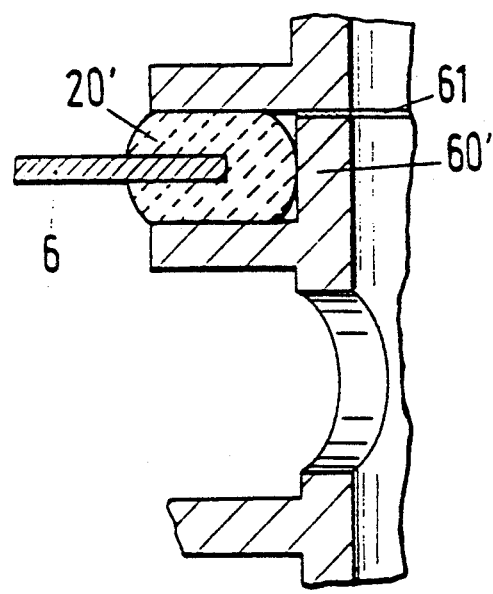
FIG. 7b illustrates a view similar to FIG. 7a of a sealing ring employed as a spacer ring in accordance with the invention.

The spacer rings 60 may also be replaced by other means, for example, the rings 18 shown in FIG. 1 can be used for this purpose. Alternatively, as shown in FIG. 7b, each feed element 2 may be provided with a circular extension 60' to function as a spacer. In each case, the spacer must consist of an electrically insulating material or an insulating separating layer 61 (see FIG. 7b) must be provided between adjacent feed elements 2.

As illustrated, each spacer ring 60 may be concentrically disposed within a sealing ring 20.

Referring to FIG. 7b, each electrochemically active plate 6 may be sealingly disposed within a spacer ring 20'. This provides a particularly efficient manner of sealing and clamping the plate 6 in place. In this case, the inner edge of the central aperture of the plate 6 is encased within a groove of the sealing ring 20'. This also provides a more reliable seal between the air and gas chambers.

The spacing rings 60, 60' between adjacent feed elements 2 ensure that the sealing rings 20 are capable of being compressed only to a limited degree. Thus, given suitable dimensions of the spacer rings 60 and sealing rings 20, the force acting on the electrochemically active plates 6 can be kept small enough to ensure that there are no cracks or breakages in the plates 6.

The invention thus provides a gas and air feed member for a fuel cell battery of relatively simple construction. Further, the invention provides a fuel cell battery in which air and gas spaces can be effectively sealed from each other and in which induced stresses due to differences in thermal expansion are kept small.

What is claimed is:

1. A gas and air feed member for a fuel cell battery comprising an axially symmetrical plate-like hollow member defining a boundary between a gas space for exposure to an electrochemically active plate and an air space; and a tubular member passing through said hollow member on an axis of symmetry thereof for conducting a gas flow therethrough, said tubular member being in communication with said gas space to deliver a flow of gas therethrough in countercurrent to a flow of air in said hollow member.

2. A feed member as set forth in claim 1 wherein said tubular member has flange-like ends with one of said ends in contact with said plate.

3. A feed member as set forth in claim 1 which further comprises a plurality of electron-conducting structures in said gas space, each said structure having a contact element forming an electrical connection with a surface of said plate.

4. A feed member as set forth in claim 3 wherein said plate-like hollow member is electrically conductive and is in electrical contact with said electron-conducting structures.

5. A feed member as set forth in claim 3 wherein each electron-conducting structure is resilient and flexible in directions axial and radially of said plate-like hollow member.

6. A feed member as set forth in claim 3 wherein said electron-conducting structures are disposed to direct a flow of gas in said gas space.

7. A feed member as set forth in claim 1 wherein said hollow member is a circular plate.

8. A feed member as set forth in claim 1 wherein said hollow member is a polygonal plate.

9. A feed member as set forth in claim 1 wherein said hollow member has an internal chamber communicating with said air space for conveying a flow of air in countercurrent to a flow of gas in said gas space.

10. A fuel cell battery comprising
a plurality of electrochemically active pates disposed in coaxially spaced apart stacked relation;
a plurality of gas and air feed members disposed in alternating relation with said plates, at least one of said members including a plate-like hollow member parallel to and spaced between a pair of said plates to define a gas space exposed to one of said pair of plates and an air space exposed to the other of said pair of plates and a tubular member passing coaxially through said hollow member for conducting a gas flow therethrough, said tubular member being in communication with said gas space to deliver a flow of gas therethrough; and
means for passing a flow of air into each said hollow member in a countercurrent to a flow of gas in an adjacent gas space for removing heat therefrom.

11. A fuel cell battery as set forth in claim 10 wherein said tubular member has flange-like ends with one of said ends in contact with said one plate.

12. A fuel cell battery as set forth in claim 11 which further comprises a plurality of sealing rings, coaxial of said plates, each sealing ring being clamped between a pair of said feed members.

13. A fuel cell battery as set forth in claim 12 wherein each said ring is exposed to a respective air space.

14. A fuel cell battery as set forth in claim 12 which further comprises a centrally mounted traction member for clamping said plates, said feed members and said sealing rings together.

15. A fuel cell battery as set forth in claim 10 which further comprises a first plurality of electron-conducting structures in each said gas space and a second plurality of electron-conducting structures in each said air space, each said structure having a contact element forming an electrical connection with a surface of a respective plate.

16. A fuel cell battery as set forth in claim 15 wherein each contact element is resiliently biased against a respective plate.

17. A fuel cell battery as set forth in claim 10 wherein each plate is conical in form.

18. A fuel cell battery as set forth in claim 10 wherein each plate is corrugated.

19. A fuel cell battery as set forth in claim 10 which further comprises a peripheral wall member coaxial of each feed member to define an annular space therewith to receive a flow of air from said air space of said respective feed member and a flow of gas from said gas space of said respective feed member for combustion therein.

20. A fuel cell battery as set forth in claim 10 which further comprises a plurality of ducts, each said duct being coaxial of each feed member and in communication with said gas space thereof for receiving gas therefrom and a header connected to said ducts to remove gas therefrom.

21. A fuel cell battery as set forth in claim 10 which further comprises a plurality of spacer rings disposed in alternating relation with said feed members for spacing said feed members coaxially of each other.

22. A fuel cell battery as set forth in claim 21 further comprises a plurality of sealing rings coaxial of said plates, each sealing ring being clamped between a pair of said feed members, concentrically of a respective spacer ring.

23. A fuel cell battery as set forth in claim 21 wherein each plate is sealingly disposed within a respective spacer ring.

24. A fuel cell battery as set forth in claim 10 where each plate is a solid electrolyte for conducting oxide ions having a coating on each side for conducting an electrode reaction and for electrical conduction.

25. A fuel cell battery as set forth in claim 10 wherein each said hollow member has an internal chamber connected to and between said means and a respective air space to convey a flow of air in countercurrent to a flow of gas in a respective gas space.

26. A fuel cell battery as set forth in claim 25 which further comprises a plurality of fins in said internal chamber to promote heat transfer.

* * * * *